United States Patent [19]

Butel et al.

[11] Patent Number: 5,150,066
[45] Date of Patent: Sep. 22, 1992

[54] PROGRAMMABLE DIGITAL SIGNAL DELAY DEVICE AND ITS USE FOR A ERROR CORRECTION CODE DEVICE

[75] Inventors: Pascal Butel, Brive La Gaillarde; Alain Dahiot, Ussac; Joël Ferrier, Brive La Gaillarde, all of France

[73] Assignee: U.S. Philips Corporation, New York, N.Y.

[21] Appl. No.: 530,712

[22] Filed: May 30, 1990

[30] Foreign Application Priority Data

May 30, 1989 [FR] France .................. 89 07099

[51] Int. Cl.⁵ .................. H03K 5/159; H03K 7/00; H03K 17/00; G06F 11/00
[52] U.S. Cl. .................. 328/55; 328/63; 328/72; 307/595; 307/597; 307/602; 307/603; 307/605; 371/31
[58] Field of Search .................. 371/31, 67, 69, 62; 307/590, 595, 596, 597, 602, 603, 605; 328/55, 63, 72

[56] References Cited

U.S. PATENT DOCUMENTS 4,001,599  1/1977  Karklys .................. 307/596
4,825,109  4/1989  Reynolds .................. 307/602

OTHER PUBLICATIONS

Wyland, "Shift Register Can Be Designed Using RAMs and Counter Chips", EDN Jan. 5, 1974, pp. 64–67.

*Primary Examiner*—Stanley D. Miller
*Assistant Examiner*—Trong Phan
*Attorney, Agent, or Firm*—Jack E. Haken

[57] ABSTRACT

A programmable digital signal delay device for delaying a digital serial input signal SIN by a period $\tau = M.H.$ (where M is an integer H is the bit rate) and transforms SIN into a delayed output signal SOUT having the same bit rate, the number M being programmable in steps. The device includes an input register (4), a RAM (6) whose r bit locations contain p bits, an output register (8) and means for controlling the RAM which are formed by a decoder (11) which receives the number M, a cyclic counter (12) which receives a programming number N (or n) from the decoder whereby it cyclically addresses the RAM, and a sequencer (13) which supplies the RAM with the write and read control signals.

9 Claims, 3 Drawing Sheets

PROGRAMMABLE DIGITAL SIGNAL DELAY DEVICE AND ITS USE FOR A ERROR CORRECTION CODE DEVICE

BACKGROUND OF THE INVENTION

1. Field of the Invention

The invention relates to a delay device for delaying a digital serial input signal SIN by an integer number of M bit periods H, so by a time $\tau=M.H.$, and for transforming it into a delayed digital serial output signal SOUT having the same bit rate as SIN, the number M being programmable in steps.

The device in accordance with the invention enables delays of some megabits to be obtained with clock frequencies (bit rates) which may exceed 100 MHz. Such a performance enables easy application of this device notably for known error correction code devices which are used in the field of telecommunication, for example for realising delays in excess of 500 bit periods with a bit rate in the order of 40 MHz. Generally speaking, such a device can be used wherever it is necessary to delay a digital signal without changing the rhythm, as is the case in devices of the first-in-first-out type (FIFO). Another use in the telecommunication field is baseband filtering and, in the video field, two-dimensional filtering and other applications stemming from the emergence of digital television.

2. Description of the Related Art

The prior art in this technical field suffers, for example from the technical problem that the horizontal contours of a video image must be extracted by calculation of the gradient of two points situated on the same vertical. This operation necessitates the delay of a video line in order to compare it with the next line; for example, 4 delay devices which each have a capacity of several hundreds of pixels are required for this purpose.

The following solutions are known and used at present in order to solve this kind of problem:

The use of analog delay lines which are also capable of treating digital signals.

These lines are realised by association of active elements such as amplifiers and passive elements such as choke coils and capacitances. They have the drawback that they are asynchronous, that they are not stable in time because of the drift of the passive components, that their programming capacity is limited, and that they are expensive.

The use of CCD (charge-coupled device) delay lines

These lines are formed by a series of cells capable of storing an electric charge, the cells being interconnected by MOS transistors which enable, in the conductive state, the passage of charges from one cell to the next. In a CCD system there can be distinguished a voltage/current converter, the CCD array and its control signals, a current/voltage converter, and an output sampling device. The drawbacks of CCD lines consist in that they are slow (clock frequency less than 20 MHz), that they are difficult to deploy (several supply voltages are necessary), that it is impossible to obtain a programmable delay, and that they are costly.

The use of programmable flip-flop registers (D flip-flops)

The operation of these registers, having characteristics which are close to those envisaged by the invention, is fully digital and they are widely used and easily deployed. The shift frequencies may reach very high values (in excess of 100 MHz) and these registers are readily programmable. A major drawback, however, still resides in the realisation of long delays, given the fact that each delay bit period necessitates the use of a flip-flop with its specific clock input; moreover, the use of numerous switches for creating long delays imposes the problem of excessive propagation times. For long delays, in excess of 500 bit periods, the number of flip-flops required becomes prohibitive and the cost becomes very high. For example, there is known the shift register HEF 4557 B, manufactured by Philips, which is programmable from 1 to 64 bits and which can operate at a clock frequency of 20 MHz. Typically below 15 V, there is also known the shift register AMD 2804 which is manufactured by the United States company AMD and which can produce delays of between 1 and 256 bits at clock frequencies of 4 MHz.

SUMMARY OF THE INVENTION

In accordance with the invention, the drawbacks of the prior art are mitigated or eliminated as a result of the fact that the delay device as disclosed in the first paragraph is characterized in that it comprises an at least one-bit input register, a random access memory (RAM) whose r bit locations contain an integer number of P bits which is at least equal to 1, an at least one-bit output register, and means for controlling the RAM which are formed by a decoder which receives the number M in digital form on an input bus, a cyclic counter which receives, from the output bus of the decoder, a programming number N or its principal part n whereby it cyclically addresses the RAM, and a sequencer which receives a write/read cycle control signal from the cyclic counter and which supplies the RAM with the write and read control signals.

The basic idea of the invention is to use a RAM as a register and to make this register operate generally as a normal shift register, except for the fact that in order to form a predetermined delay time, the information in digital form remains stored in a fixed location of the RAM instead of being propagated through the various bit locations as is the case in a shift register. In order to achieve such operation, cyclic addressing of the RAM is necessary as well as synchronization of the write and read instants with respect to the bit clock and decoding of the number of delay bits required in order to take into account a given number of delay bits intrinsically induced, during operation, by the RAM and the associated input and output registers. It is to be noted that the RAM may have a large capacity for the storage of digital information, linked directly to the desired delays, that it operates at a high speed, in direct relation with the number of bits per memory location, that it necessitates a single clock input, and that its price is very low in comparison with that of several hundreds, or even thousands of D flip-flops, each of which comprises a clock input. It is also to be noted that a flip-flop on an integrated circuit wafer for one bit takes up twice as much area (of silicon surface) in comparison with an 8-bit cell of the RAM.

A preferred embodiment of the device in accordance with the invention is characterized in that the RAM is organized in p-bit words, p being equal to 2 or a multiple of 2, said input register comprising a serial input and p parallel outputs, said output register comprising p parallel inputs and one serial output, and in that it also comprises, just upstream from said input register, a programmable shift register which receives the least-significant bits from the output bus of the decoder and which supplies a number of shift bits l so that $np+1-1=N$, said decoder being constructed to apply said principal part n of the programming number N to said cyclic counter.

The principal advantage of this embodiment consists in that the multiplexing of the bits before writing into the memory enables clock frequencies to be obtained which are typically higher than 100 MHz at a cost which is very low in comparison with to the solution involving flip-flops; by way of example, prediffused circuits can be mentioned where one RAM cell represents 3 equivalent gates instead of the 6 for a D flip-flop.

BRIEF DESCRIPTION OF THE DRAWINGS

The invention will be described in detail hereinafter, by way of example, with reference to the accompanying drawings.

DETAILED DESCRIPTION OF THE INVENTION

Figure 1:
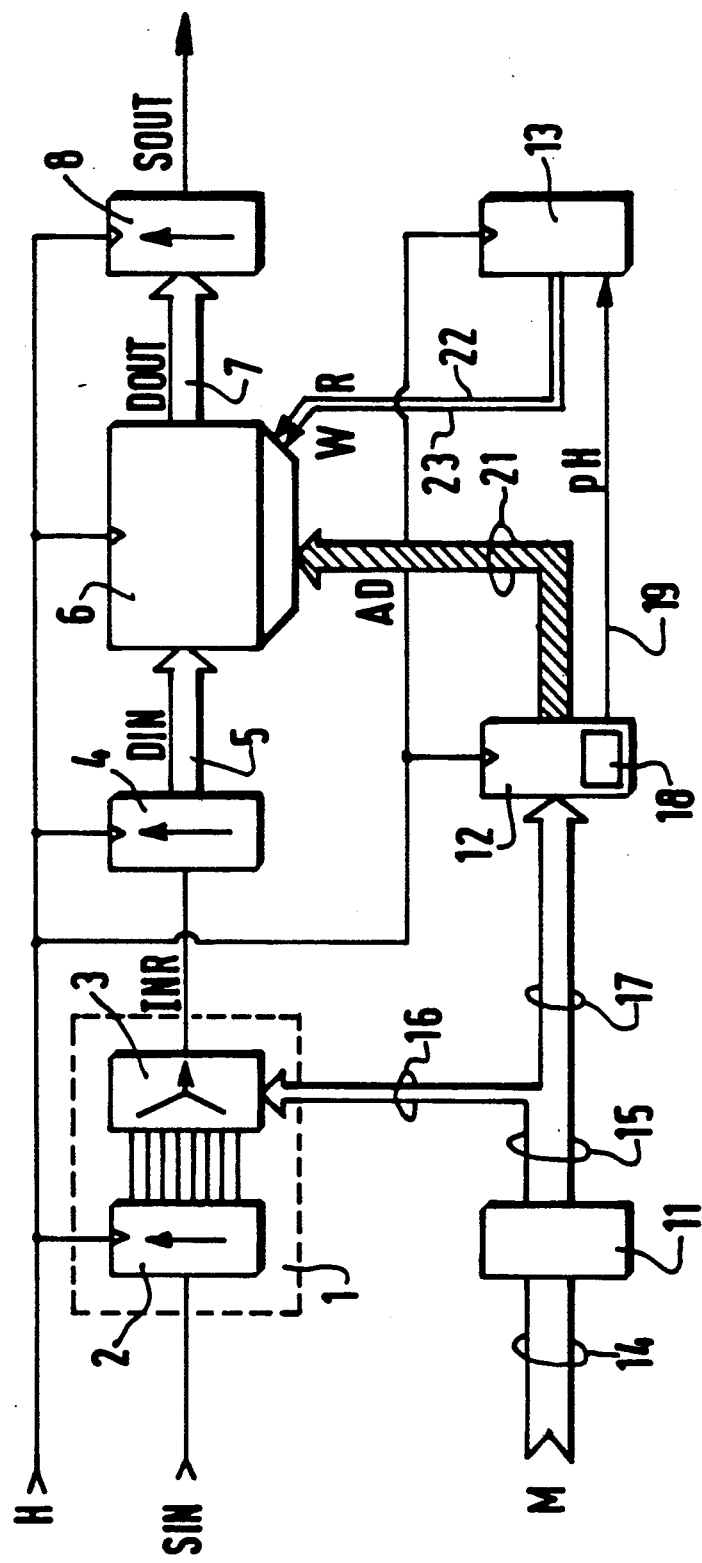
FIG. 1 shows the synoptic diagram of a first embodiment in accordance with the invention.

The delay device shown in FIG. 1 is formed by a primary processing chain for a digital input data signal SIN shown, at the top of the Figure, and a secondary chain for controlling the primary chain, shown at the bottom of the Figure. The signal SIN is applied to a shift register which is programmable in steps of 1 bit and which is denoted by the reference numeral 1. The register 1 is formed, for example, by the series connection of a p-bit shift register 2 which comprises a serial input and p parallel outputs, and a multiplexer 3 which comprises p parallel inputs, 1-out-of-p, and a serial output. The register 1 applies a serial digital signal INR to an input register 4 which is identical to the shift register 2 which supplies, via a data bus 5 comprising p conductors, a signal DIN to a random access memory (RAM) 6 which comprises r p-bit locations. A p-conductor output bus 7, carrying the signal DOUT, is connected to an output register 8 which comprises p parallel inputs and a serial output which is also the output of the delay device and the source of the signal SOUT. The signal SOUT is a replica of the signal SIN, delayed by an integer number of M bit periods whose minimum value is in the order of a few bit periods (typically less than 20 bits) and whose maximum value may reach several megabits. A clock signal H, having a period H, is applied to the registers 2, 4 and 8 and to the memory 6. The frequency 1/H of the clock signal may exceed 100 MHz. In order to form delays up to some hundred of bits with a bit rate 1/H of 40 MHz, the elements 2, 3, 4, 6 and 8 can be realized by means of the following integrated circuits, in conjunction with their control circuits to be described hereinafter:

registers 2 and 4: 74F164
multiplexer 3: 74F151
memory 6: static RAM HM65161 manufactured by the French company Matra Harris,
register 8: 2 times 74F194.

The value of p, preferably being greater than 1 and equal to 2 or a multiple of 2, is chosen to be equal to 8 in the present embodiment. The maximum possible bit rate 1/H is a direct function of p and hence is higher as the value of p is greater. The shift register 1 is optional; in its absence, the delay device enables delays to be formed in steps of p bits. However, for the majority of applications and even for long delays it is desirable to obtain delays varying in steps of 1 bit; this allowed for by the programmable register 1.

The secondary control chain, shown at the bottom of FIG. 1, is formed by a decoder 11, a cyclic counter 12 and a sequencer 13 which are realised, for example, by way of the following integrated circuits:

decoder 11: several cascade-connected adders HE4008B
counter 12: several circuits 74F163
sequencer 13: 74F374.

The clock signal H is applied to the elements 12 and 13. The decoder 11 receives, in parallel digital form, from a bus 14 the number of delay bit periods M imposed by the user. From this number a fixed integer number q equal to a few units is subtracted in the decoder 11. The substraction M-q is performed, for example by addition of the two's-complement of q. The decoding performed in 11 produces a number N in parallel digital form on a bus 15 at the output of the decoder 11. The least-significant bits are transmitted, via a bus 16, to the multiplexer 3 for selecting one of its p inputs, and the remaining (most-significant) bits are transmitted, via a bus 17, to the cyclic counter 12. The bus 16 carries the number $l-1$ so that $1 \leq l \leq p$ and the bus 17 carries the number n whose smallest value is 1. In the counter 12 a clock change takes place at 18 in order that this counter is incremented by one unit every p clock beats, thus obtaining a counting clock with the period pH which is also transmitted to the sequencer 13 via a conductor 19. The counter 12 performs a cyclic counting operation . . . 0, 1, . . . , n-1, 0, 1 . . . and these n counts are applied in binary form as read addresses and write addresses via an address bus 21, enabling the formation of n read-before-write cycles, each of which has a duration pH, in n memory locations among the r locations of the memory 6. The read-before-write sequence within each cycle is created by the sequencer 13 which receives the clock signals H and pH for this purpose and which is controlled so as to supply the memory 6 with a read signal R on a conductor 22, followed by a write signal W on a conductor 23.

Figure 2:
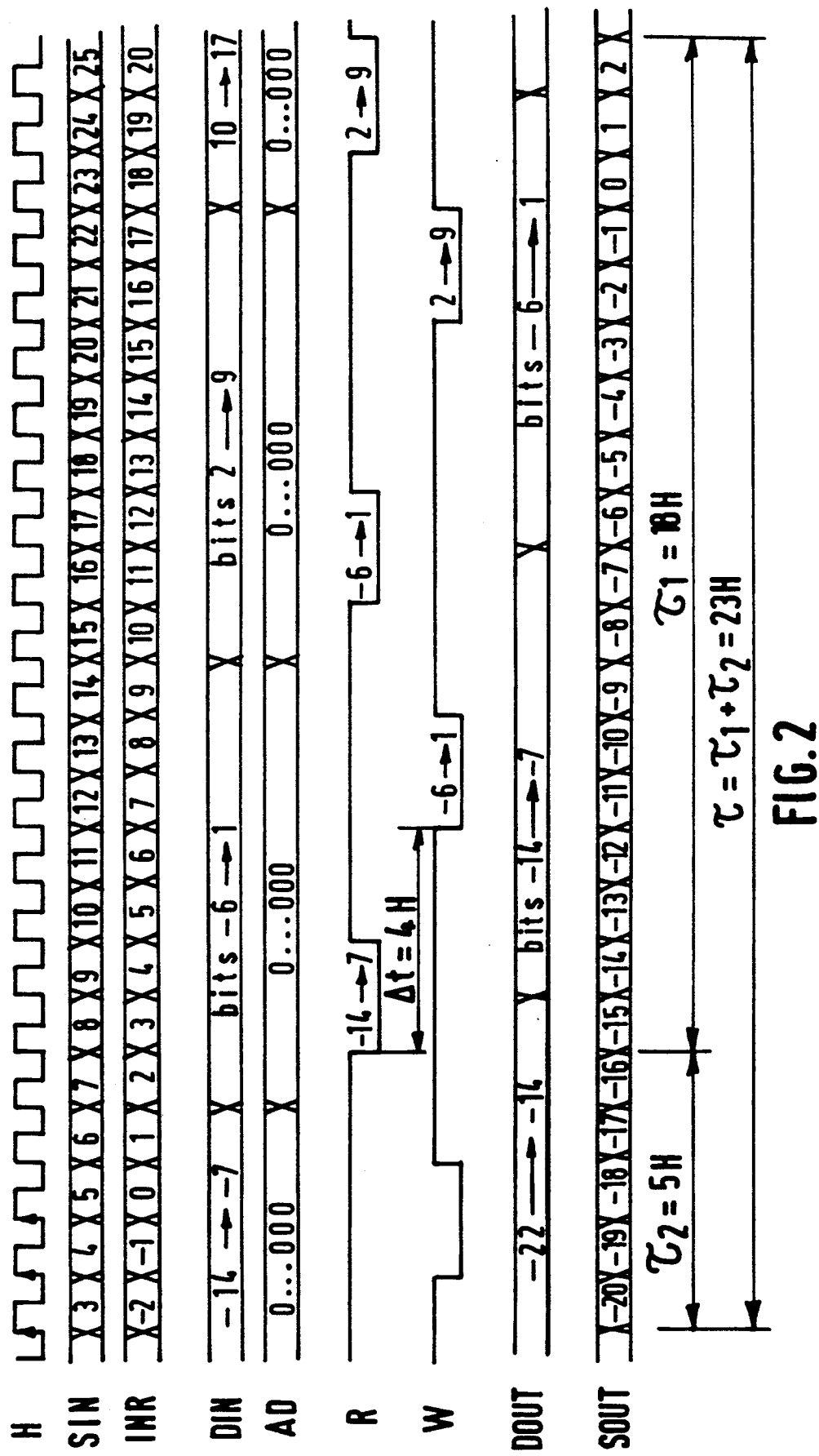
FIG. 2 shows a time diagram illustrating the operation of the device shown in FIG. 1.

The operation of the delay device is illustrated by the time diagram of FIG. 2 for the specific case where a single 8-bit memory location is used in the memory 6, corresponding to the value n=1, to the state 0 . . . 001 for the bus 17, and to the state 0 . . . 000 for the address bus 21. FIG. 1 shows the signals H, SIN, INR and DIN, AD, being the addressing state of the bus 21, R, W, DOUT and SOUT.

The number M applied to the input bus 14 of the decoder is, for example equal to 23, causing a delay equal to $\tau=23$ H between the signals SIN and SOUT. The decoder 11 adds the binary representation in two's complement of the number q=11 to the number M. The 3-conductor bus 16 carries the binary number $1-1=100$, or 4, introducing a delay of the signal SIN across the shift register 1 which is equal to $\tau_2=5$ H, corresponding to the value l=5. The bus 17 which comprises, for example 6 conductors, carries the binary number n=00000001, which appears on the output bus 21 of the cyclic counter 12 as the permanent binary configuration 000000 which addresses the first location of the memory 6. The programming number N on the bus 15 is, therefore, equal to 000001100 and its principal part n equals 1. It is to be noted that for values of n greater than 1, the counter 12 cyclically supplies, in the rhythm ⅛ H, the n first addresses of the memory 6 between 0 and n−1. The read-before-write phases, being disjunct, in the course of each cycle having the duration 8 H are chosen so that a time interval Δt equal to an integer number of k periods H separates the instants marking the start of each phase. In the example of FIG. 2, Δt=kH=4 H is chosen. A location of the memory 6 which is written at an instant $t_1$ is thus read, n cycles later, at the instant $t_1+nph-kH$ i.e. with a delay of 4 H in the case of FIG. 2. However, the assembly of the elements 4, 6 and 8 produces an intrinsic delay $\tau_3=mH$ which is conditioned by the technology and the type of memory used, said delay, being in the order of a few clock periods, also being made equal to an integer number of m periods H by way of the synchronization described above. In FIG. 2 the delay $\tau_3$ is equal to $\tau_3=mH=14$ H and takes into account the delay pH due to the parallelization of the signal INR by the shift register 4. The calculation of the number q can be deduced from the following two relations:

$$M-q=np+1(l-1)=N$$

$$M=(np-k)+m+1$$

so that $$q=m-k+1.$$

It is to be noted that the device shown in FIG. 1 can also be adjusted by calibration and control, i.e. the number q to be substracted in the decoder 11 can be obtained without prior calculation by applying to the bus 15 the binary configuration 0 . . . 01000 and by measuring the delay, equal to qH, between the signals SIN and SOUT.

Figure 3:
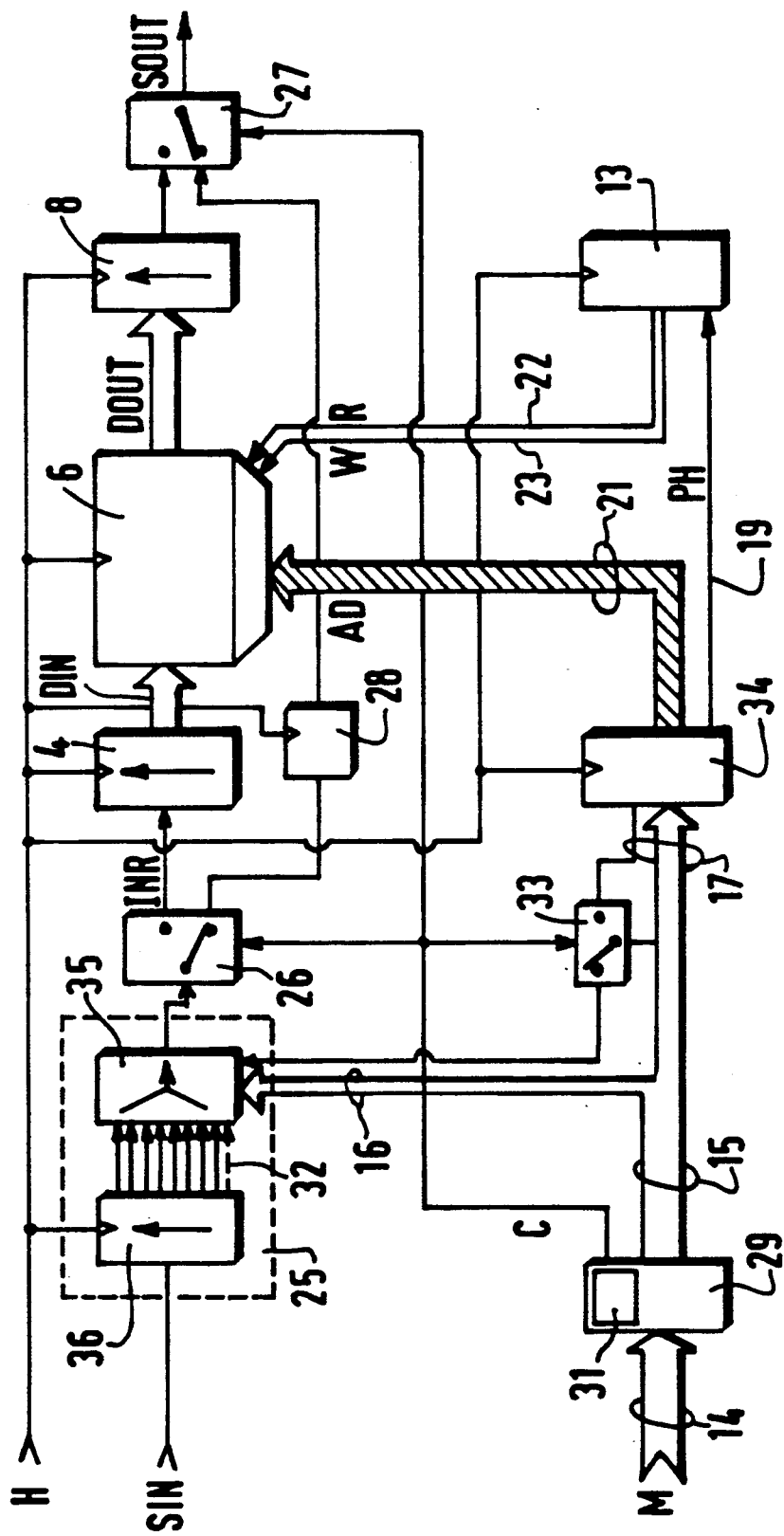
FIG. 3 shows the synoptic diagram of a second embodiment in accordance with the invention.

The delay device of FIG. 1 enables delays to be established which are programmable in steps of H equal to or greater than (p+q)H, so 19 H in the example of FIG. 2. For given applications it may be necessary to have a quasi-universal device, that is to say a device which has the performance of the device of FIG. 1 and which also enables the small delays between 2 H and (p+q−1)H to be obtained. In this case, adaptation of the electronic diagram of FIG. 1 is necessary as shown in FIG. 3 in which the following supplementary elements can be distinguished: between the programmable shift register 25 and the input register 4 as well as at the output of the delay device there are provided two two-position switches 26 and 27, respectively, enabling extraction of the serial digital information which no longer travels through the elements 4, 6 and 8 but through a 1-bit synchronization register 28 which receives the clock signal H. The switches 26 and 27 are controlled by a signal C having two states, 0 or 1 which originates from the decoder 29 which performs said extraction shown in FIG. 3 when it is detected in the decoder 29 that the number M is smaller than p+q (C=0, for example). The signal C is generated in the decoder 29 by means of logic circuits which are denoted as 31 and whose control can be determined by those skilled in the art. It is to be noted that the signal C must also slightly modify the decoding within the decoder in order to take into account the delay by one clock period which is introduced by the register 28; for example, for the binary input configuration M=0 . . . 0010 on the input bus 14, the configuration on the output bus 15 must be N=0 . . . 0000. Moreover, the programmable shift register 25 has a length which is at least equal to p+q−1 and this register, therefore, receives one or more supplementary conductors for its programming; these modifications are shown in FIG. 3 by way of the interrupted line 32, inside the register 25, and by way of the two-position switch 33 which is controlled by the signal C and which enables the branching of one or more conductors, having a rank which is higher than those of the bus 16, from the cyclic counter 34 to the multiplexer 35.

Preferably, the delay circuit of FIG. 1 or FIG. 3 is realised in the form of a single integrated circuit 40 on a semiconductor wafer.

A simplified embodiment (not shown) consists in the omission of the programmable shift register 1 in the delay device shown in FIG. 1, the routing of all conductors of the bus 15 to the cyclic counter 12, and the use of a RAM 6 having 1-bit locations. This leads to a very simple diagram of the delay device in accordance with the invention, be it for applications for which the clock frequency 1/H is low, i.e. typically less than 10 MHz.

A static RAM has been described which is the most appropriate for carrying out the invention; however, it is alternatively possible to utilize a dynamic RAM, provided that, at least for the n locations used among the r locations of the memory, refresh cycles are performed, during each period npH in order to prevent loss of the information contained in these n location. On the other hand, in the FIGS. 1 and 3 the RAM 6 is represented with a separate input data bus and a separate output data bus; a common input/output data bus can be used in known manner by using appropriate commands for this other type of memory configuration. The write/read control signal for the RAM 6 may also be supplied via a single conductor from the sequence 13; in the latter case another write or read validation conductor which links the elements 13 and 6 will be necessary.

We claim:

1. A delay device for delaying a digital serial input signal SIN by a programmable integer number M of periods H, so by a time $\tau=M.H$, and for transforming it into a delayed digital serial output signal SOUT having the same bit rate as SIN, comprising an at least one-bit input register, a random access memory (RAM) connected to the input register and having a plurality r of memory locations each location containing an integer number p of bits which is at least equal to 1, an at least one-bit output register connected to the random access memory, and means for controlling the RAM including a decoder which receives the number M in digital form on an input bus, and produces a programming number N on an output bus, a cyclic counter connected to the decoder and the RAM which receives, from the output bus of the decoder, the programming number N or its principal part n and cyclically addresses the RAM, and a sequencer connected to the cyclic counter for receiving a write/read control signal from the cyclic counter and supplying the RAM with write and read control signals.

2. A delay device as claimed in claim 1, in which the decoder comprises a subtractor for subtracting a number q from M wherein q is related to an internal delay expressed as an integer number of periods H intrinsically induced by said input and output registers and the RAM during operation.

3. A delay device as claimed in claim 2, in which the RAM is organized in p-bit words, p being equal to 2 or a multiple of 2, and said input register comprises a serial input and p parallel outputs, and said output register comprises p parallel inputs and one serial output; and also comprising a programmable shift register connected to the input register which receives the least significant bits from the output bus of the decoder and which supplies a number of shift bits l so that $np+l-1=N$, said decoder being constructed to apply said principal part n of the programming number N to said cyclic counter.

4. A delay device as claimed in claim 3, in which said programmable shift register comprises a series connection of a p-bit shift register having a serial input and p parallel outputs, and a multiplexer having p parallel inputs and a serial output.

5. A delay device as claimed in claim 3, in which said shift register is programmable in steps of 1 bit and has a length is at least equal to $p+q-1$, and said decoder comprises detection means for detecting whether the number M is greater than or equal to or smaller than $p+q$, and control means responsive to the detection means for switching, if M is smaller than $p+q$, the least significant input bits of the decoder simultaneously to a simplified internal decoding device of the decoder, and the serial data output of the programmable shift register to the output of said delay device.

6. A delay device as claimed in claim 1, comprising a single integrated circuit.

7. The use of the delay device as claimed in claim 1 for an error correction code device in order to realize delays greater than 500 bit periods with a bit rate of about 40 MHz.

8. The use of the delay device as claimed in claim 1 for delaying one or more image lines encoded in digital form.

9. The use of the delay device as claimed in claim 4 for delaying one or more image lines encoded in digital form.

* * * * *